UNITED STATES PATENT OFFICE.

EDWARD J. SHEEHAN, OF PASADENA, CALIFORNIA, ASSIGNOR OF ONE-HALF TO WILLIAM S. McCAY, OF PASADENA, CALIFORNIA.

SEPARATING THE COMPONENT PARTS OF LIQUIDS.

1,211,361.  Specification of Letters Patent.   Patented Jan. 2, 1917.

No Drawing.   Application filed February 8, 1915.  Serial No. 6,732.

*To all whom it may concern:*

Be it known that I, EDWARD J. SHEEHAN, a citizen of the United States, residing at Pasadena, in the county of Los Angeles and State of California, have invented new and useful Improvements in Separating the Component parts of Liquids, of which the following is a specification.

My invention relates to a process for separating the component parts either in suspension or solution of liquids by submitting the same to a temperature that will freeze into a solid one of the parts and removing it.

My process is especially adapted for separating the component parts either in solution or suspension of liquid extracts of vegetable, animal or mineral substances, and more particularly for dehydrating fruit juices and preserving them.

My invention may be specifically applied to the treatment of citrus fruit juices by partially dehydrating and then preservation by the addition of sugar, and in cases where necessary sterilization with ozone so that the finished product will retain its natural flavor, fragrance and color without perceptible change when stored for commercial purposes, and whereby no chemical change takes place in the important and necessary component parts during the treatment. Ozone is not required for sterilization when some of the constituents such as the fruit acids, sugars or oils are present in sufficient amount to prevent fermentation.

My process is applied to citrus fruit as follows: After the fruit has been treated for the removal of the flavoring properties of the peel or by peeling the fruit, it is then immersed in water to extract any properties that will contaminate the juice, also to keep the fruit from exposure to the air, thus preventing decomposition of the tissues and also for the purpose of saturating with water the tissues of the fruit so that they will not absorb the juice in pressing. The treated fruit is then formed into the cheeses in press cloths that are of a fineness that will separate the pulpy matter from the juice when pressed. The juice so expressed is run into a receptacle provided with refrigeration means, and is reduced to a temperature that will prevent fermentation. From this receptacle it is run into another receptacle provided with refrigeration means, and the juice circulated about the refrigeration means so that in the freezing none of the component parts of the juice other than water will be pocketed or retained in the solid formed as ice. When dehydration is carried on to the desired point, the ice and the liquid are separated. If necessary sugar is added to assist in preventing fermentation, to prevent oxidation of the flavoring properties and to prevent caramelization in cases where the amount of acid present in the fruit will give that result. The sugar can be added either before freezing and dehydrating, but preferably afterward. Ozone or ozonized air is used to sterilize such juices as cannot be preserved by dehydration and the addition of sugar, and may be injected at any convenient time, but preferably during freezing.

Heretofore in the dehydrating and treatment of juices from fruits and other sources, cooking has ordinarily been employed to drive off the water therefrom and reduce the juice to a syrupy consistency, together with the introduction of undesirable preservatives. Methods of this character have been objectionable in that the heat applied has resulted in chemical changes affecting the natural color, flavor and fragrance of the fruit juices, and these methods have not been found to be commercially valuable in the treatment of citrus fruit.

What I claim is:—

1. A process of treating liquids extracted from vegetable, animal and mineral matter, consisting in subjecting the liquid to a temperature sufficient to cause solidification of one of the components, sterilizing the liquid and separating the solid and liquid components.

2. A process of treating liquids extracted from vegetable, animal and mineral matter, consisting in subjecting the liquid to a temperature sufficient to cause solidification of one of the parts, agitating the liquid during freezing, sterilizing the same, and separating the solid and liquid components.

3. A process of treating liquids extracted from vegetable, animal and mineral matter, consisting in subjecting the liquid to a temperature sufficient to cause a solidification of one of the components, agitating the same during solidification, sterilizing by contacting the liquid with ozone and separating the solid and liquid parts.

In witness that I claim the foregoing I have hereunto subscribed my name this 29th day of January, 1915.

EDWARD J. SHEEHAN.

Witnesses:
ERNEST L. WALLACE,
EDMUND A. STRAUSE.